May 8, 1945.  L. O. CEDERWALL  2,375,196
LOCKING MECHANISM FOR DOORS
Filed June 26, 1943  2 Sheets-Sheet 1
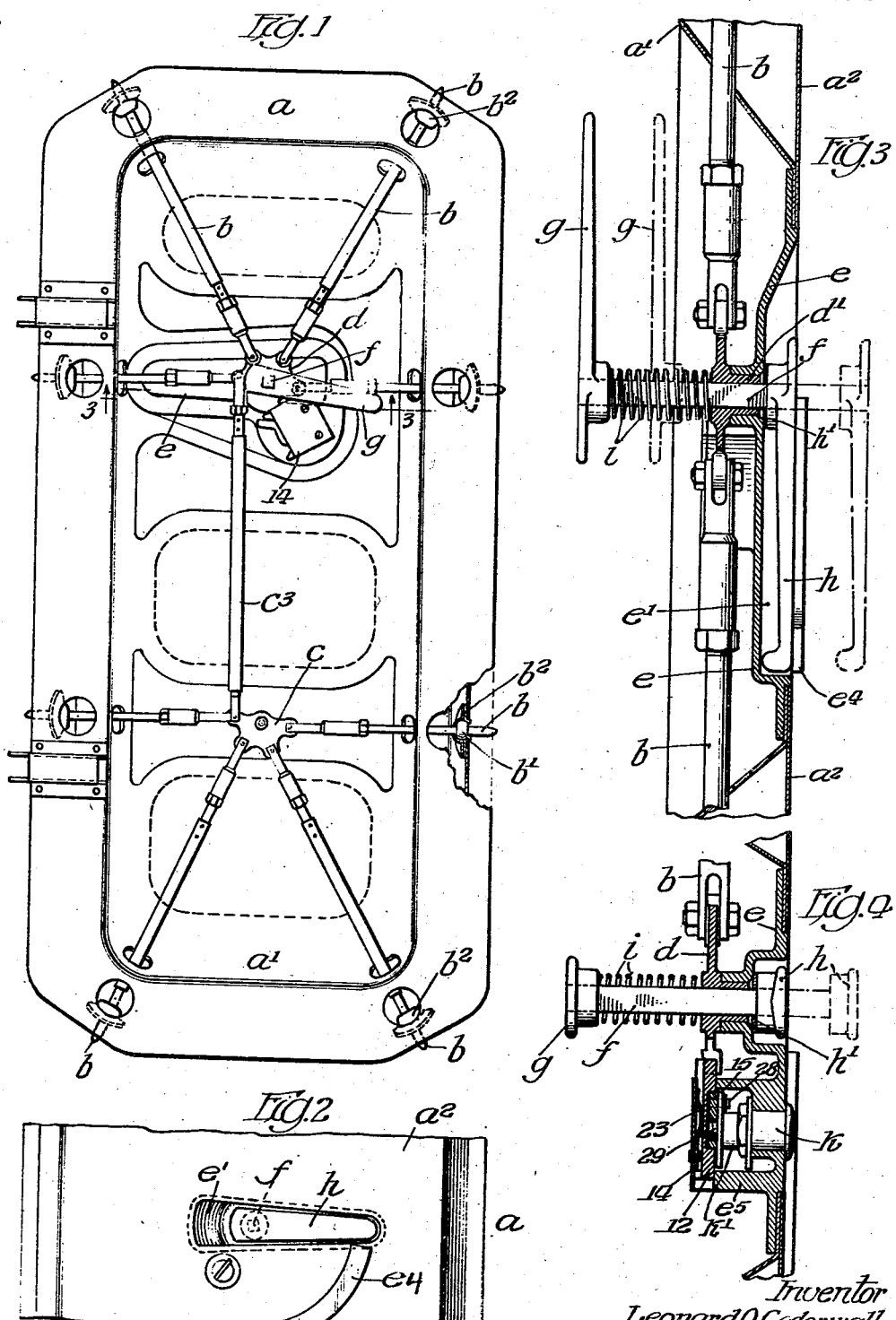
Inventor
Leonard O. Cederwall
By Fred Gerlach his Atty

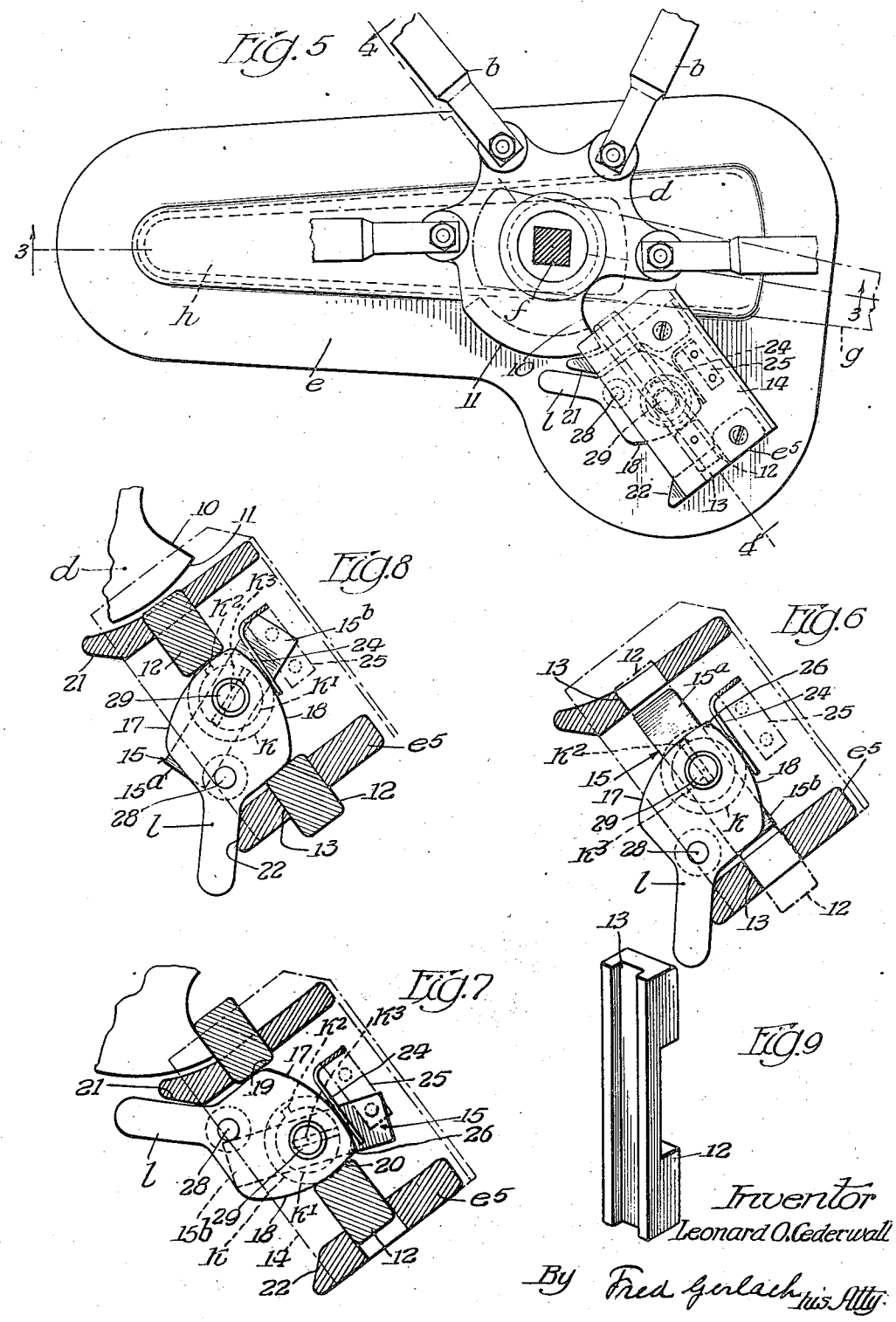

UNITED STATES PATENT OFFICE 2,375,196

LOCKING MECHANISM FOR DOORS

Leonard O. Cederwall, New Orleans, La., assignor to Consolidated Vultee Aircraft Corporation, San Diego, Calif., a corporation of Delaware Application June 26, 1943, Serial No. 492,390

5 Claims. (Cl. 70—118)

The invention relates to locking mechanism for doors.

In aircraft it is desirable and advantageous to provide shifting mechanism for the door-locking bolts which includes a lever on the outboard side of the door, and an inboard handle or lever whereby the bolts may be shifted from either the inside and outside of the door, and also to provide locking mechanism for the shifting mechanism which is key controlled from the outside and selectively controlled from the inside of the door so that the shifting mechanism may be unlocked from the inside of the door without the use of a key.

One object of the invention is to provide improved locking means for the bolt-shifting mechanism which is key-controlled from the outside of the door.

A still further object of the invention is to provide locking mechanism for the bolt-shifting mechanism which is key-controlled from the outside and selectively controlled from the inside of the door, which is simple in construction and efficient in operation.

Another object of the invention is to provide shifting mechanism for the locking bolts which comprises a slidable and rotatable shaft, hand-levers rigidly secured on the inner and outer ends of the shaft, and a recess for the outside lever, and whereby the shifting mechanism may be operated, and locking mechanism for the shifting mechanism, which is particularly adapted for use with doors in aircraft.

Other objects will appear from the detailed description.

The invention consists in the several novel features which are hereinafter set forth and more particularly defined by claims at the conclusion hereof.

In the drawings:

Fig. 1 is an inner side elevation of an aircraft door embodying the invention.

Fig. 2 is an outer side elevation of a portion of the door.

Fig. 3 is a section taken on line 3—3 of Fig. 5.

Fig. 4 is a section taken on line 4—4 of Fig. 5.

Fig. 5 is the inside of the door and the locking mechanism for the door shifting mechanism, parts being shown in section.

Fig. 6 is a view of the device for locking the shifting mechanism when it is in its held unlocked position by the selectively shiftable lever on the inner side of the door, and the key-operable lock is locked, parts being shown in section.

Fig. 7 is a similar view of said device in the position assumed when the key-controlled lock has shifted the selectively operable lever to its plunger locking position and before the key is withdrawn from the cylinder-lock.

Fig. 8 is a similar view of said device, with the parts in the position assumed when the key-controlled lock has shifted the selectively shiftable lever to unlock the shifting mechanism and before the key is withdrawn.

Fig. 9 is a perspective of the slidable plunger.

The invention is exemplified as applied to an aircraft door $a$ which is usually formed of sheet metal with an inner wall $a'$, and an outer wall $a^2$ which may be of any suitable construction. Bolts $b$ are provided with outer ends which are adapted to be projected into holes in the door frame to lock the door in its closed position and are movable inwardly to release the door so it can be opened. One series of bolts $b$ is provided for the lower portion of the door and a similar series is provided for the upper portion of the door. Adjacent its outer end, each bolt $b$ is slidably and pivotally guided by a spherical member $b^1$ which is confined in a socket $b^2$. The inner end of each of the lower series of bolts $b$ is pivotally connected to a rotatable member or spider $c$ which is pivotally supported on the door $a$. The inner ends of the bolts $b$ of the upper series are pivotally connected to a rotatable element or spider $d$ which is controlled by the locking mechanism hereinafter described. A connecting rod $c^3$ is eccentrically pivoted to elements $d$ and $c$ and operates and controls the spider $c$ from the spider $d$. Rotation of the spider $d$ in clockwise direction will directly withdraw the upper series of bolts $b$ and through rod $c^3$ will simultaneously withdraw the bolts $b$ of the lower series. When the bolts $b$ have been withdrawn, rotation of the spider $d$ in counterclockwise direction will simultaneously shift all of the bolts to lock the door. This exemplifies bolt shifting mechanism for locking the door which is operable by rotation of the spider $d$.

The spider $d$ is provided with a hub $d^1$ which is journaled in a plate or housing $e$ which is set into an opening in the outer wall $a^2$ of the door and has its margin lapped by and secured to said wall. A square shaft $f$ extends through and is fitted to spider $d$ and its hub $d^1$ for rotation therewith and is slidable axially therethrough. A lever $g$ is fixedly secured to the inner end of shaft $f$ for rotating the spider $d$ from the inside of the door. A lever $h$ is fixedly secured to the outer end of shaft $f$ for rotating the spider from the outside of the door. A recess $e^1$ is formed in the plate or housing $e$ and conforms substantially to the marginal contour of the lever $h$ so that the outer face of said lever will be normally flush with the outer face of the door. The lever $h$ normally abuts against a washer $h^1$ which engages the wall at the bottom of the recess $e^1$ to position said lever so its outer face will be flush with the outer face of the door. A spring $i$ is interposed between spider $d$ and lever $g$ on the inner end of the shaft $f$ and yieldingly and normally holds the lever $h$ within the recess $e^1$ in the housing $e$, the shaft $f$ to its inner position, and the hub $d^1$ of spider $d$ in its bearing in the casing $e$. When the door is to be opened from the outside, the lever $h$ can be pulled out of recess $e^1$ so it will be disposed outwardly of the outer face of the door where it will be free for rotation. A rub-plate $e^4$ for lever $h$ is provided on the door. The fit between shaft $f$ and the hub $d^1$ of spider $d$ causes the spider $d$ to be rotated by either the lever $h$ or handle $g$. The spring $i$ permits the withdrawal of the lever $h$ from recess $e^1$ and normally retracts the shaft $f$ when either of the levers $h$ and $g$ is released. The sliding fit between shaft $f$ and spider $d$ also permits the shaft to be pushed outwardly to shift lever $h$ out of recess $e^1$ by outward pressure against the lever $g$ or pull on lever $h$ so that shaft $f$ can be rotated to rotate the spider $d$. This exemplifies a construction which includes a lever which is normally flush with the outside of the door, for shifting the bolts $b$ from the outside of the door and a lever for shifting the bolts $b$ from the inside of the door and a connection between the levers whereby the outside lever can be pushed out of the recess in the casing $e$ by the inside lever $g$ to permit the rotation of the spider $d$.

The invention includes mechanism for locking the spider $d$ against rotation by the levers $h$ and $g$ and this locking mechanism is adapted to be controlled from the outside of the door by a key-operable cylinder-lock $k$ and an element $l$ which functions as a lever and is selectively operable from the inside of the door. Spider $d$ is notched to form an abutment 10 and is provided with an arcuate peripheral surface 11. A plunger 12 is slidable into the path of abutment 10 to lock the spider $d$ against rotation in counterclockwise direction for holding the bolts $b$ in their locking position. Plunger 12 is slidably mounted in a guideway 13 formed in a casing $e^5$ which is integrally formed with the casing or plate $e$ and projects inwardly from said housing. A cover-plate 14 secured to the inner face of casing $e^5$ confines the plunger 12 for rectilinear movement in the guide 13. Lever $l$ is provided with cam-surfaces 17 and 18 which engage abutments 19 and 20, respectively, on the plunger 12 and fit in a recess between said abutments. Stops 21 and 22 on casing $e^5$ limit the pivotal movement of lever $l$. When the lever $l$ engages stop 21 the cam-surfaces on said lever will hold the plunger 12 in its locking position for engagement by abutment 10 on the spider $d$ to prevent counterclockwise rotation of shaft $f$ and levers $g$ and $h$. When the lever $l$ engages stop 22 cam-surfaces 17 and 18 will hold the plunger 12 out of the path of abutment 10 so that the spider $d$ will be rotatable by either of the levers $g$, $k$. The arcuate peripheral surface 11 prevents shift of the plunger 12 when the spider $d$ is not in position to hold the bolts $b$ in their locking position. A resilient or spring strip 23 frictionally holds the plunger 12 against sliding movement. A resilient or spring strip 24 secured to lug 25 on the casing $e^5$ engages the cam-surfaces on lever $l$. The cam-surfaces 17 and 18 meet at a point 26 and spring 24 acts on the cams at opposite sides of said point and serves to snap the lever $l$ to alternately engage one or the other of the stops 21 and 22. The plunger 12 is shiftable between its locked and unlocked position by the lever $l$ which is selectively operable from the inside of the door and is also operable by the key-controlled lock $k$. This lock $k$ is of any suitable construction which comprises a cylinder, a barrel $k^1$ which is rotatable in the cylinder, and provided with a key-slot $k^3$ and a notch $k^2$ in the cylinder which permits the insertion and withdrawal of the key at one predetermined rotative position. The barrel is rotatable by the key in either direction from said position so that the key must be turned to its said position before it can be withdrawn from the barrel. A lever 15 with arms 15a and 15b is fixedly secured to rotate with the barrel $k^1$ of the lock $k$. At all times when the key is withdrawn from the barrel the lever 15 will be in the position shown in Fig. 6.

An eccentric stud 28 is fixed to and projects from lever $l$ into the path of rotation of the arms 15a, 15b of the lever 15. By means of lever 15 and stud 28, lever $l$ may be shifted or controlled by a key in the cylinder-lock. When the lever 15 is in position to hold the plunger 12 into position to lock the spider $d$ and a key is inserted into the lock $k$, counterclockwise movement of the key will rotate lever 15 and cause its arm 15a to strike stud 28 and shift lever $l$ into position to shift the plunger 12 so it will release the spider $d$, as illustrated in Fig. 6. When the lever $l$ is in position to hold the plunger 12 in its releasing position, and the key is inserted in the cylinder-lock and rotated in clockwise direction, the arm 15b of lever 15 will strike the stud 28 and swing lever $l$ into position to shift the plunger 12 into its locking position. Lever $l$ is pivoted on a bushing around stud 29 which is on the barrel $k^3$ of the lock $k$ so it will swing on the axis of said lock, and is pivotally movable independently of said barrel so that the lever $l$ can shift plunger 12 independently of the cylinder-lock. This permits the spider $d$ to be unlocked from the inside of the door without the use of a key and permits the lever $l$ to be operated from the outside of the door by the cylinder-lock to shift the plunger 12 to release or to lock the spider $d$. After either operation of the lever $l$ by the cylinder-lock the lever 15 will be shifted to its normal position by the turning of the key to its withdrawal and insertion position.

The operation will be as follows: When there is no key in the cylinder lock $k$, the lever 15 will be in the position illustrated in Fig. 6 as the result of the rotation of the barrel of the cylinder-lock by the key to the point where the notch $k^3$ permits the withdrawal of the key. Lever $l$ can be selectively shifted from the inner side of the door between stops 21 and 22 to shift the plunger 12 into position to lock or release the spider $d$. This can be done independently of the cylinder-lock at all times when the key is withdrawn from the lock $k$. While the plunger 12 is in its released position, the spider $d$ will be free to be rotated by the lever-handle $h$ from the outer side of the door or by the handle $g$ from the inner side of the door. When it is desired to lock or unlock the door from its outer side, the key is inserted into cylinder lock $k$. If at such time the lever $l$ has shifted the plunger 12 to lock the spider d, the key can be rotated counterclockwise to the position shown in Fig. 8 to shift lever l so it will shift the plunger 12 to its releasing position. Such rotation will cause the arm 15ª of lever 15 to shift stud 28 and shift the lever l so its cams will slide the plunger 12 into position to release the spider d. When the spider d has been shifted either from the inner side of the door or by the cylinder-lock to shift the plunger 12 into its released position, and it is desired to lock the door from the outer side, the key will be inserted in the cylinder-lock and rotated clockwise to shift the levers 15 and l into the position illustrated in Fig. 7. This clockwise rotation of lever 15 with the barrel of the cylinder-lock will cause arm 15ᵇ to strike stud 28 and shift the lever l to shift the plunger 12 into its locking position.

The invention exemplifies locking mechanism which is particularly applicable to doors for aircraft, which is simple in construction and which provides for selective control of the locking device for the shifting mechanism from the inside of the door and for key controlled operation of said device from the outer side of the door. It also exemplifies a construction in which an outer handle lever is normally confined in a recess, and a handle at the inner side of the door are fixed to a shaft which is slidable from the inner or outer side of the door and which is rotatable to operate the bolt shifting mechanism.

The invention is not understood to be restricted to the details set forth, since these may be modified within the scope of the appended claims without departing from the spirit and scope of the invention.

Having thus described the invention, what I claim as new and desire to secure by Letters Patent is:

1. The combination with a casing on a door, a rotatable element mounted on the casing for shifting locking means for the door and provided with an abutment, a shaft mounted in the casing for rotating said element, and handles on the shaft on the inner side and the outside of the door, respectively, of a plunger mounted to slide on the inner side of the casing, into and out of relation with said abutment, a manually shiftable lever pivoted on the inner side of the casing and provided with oppositely disposed circumferential cam faces for slidably shifting the plunger between and holding it in its locking and releasing positions, a key-controlled cylinder lock accessible from the outside of the door, a second lever pivotally shiftable by the cylinder lock for shifting the first lever from plunger releasing to plunger locking position and from plunger locking to plunger releasing position, said first named lever being shiftable to set the plunger into either its locking or releasing position when the cylinder lock is locked.

2. The combination with a casing on a door, a rotatable element mounted on the casing for shifting locking means for the door and provided with a radial abutment and an arcuate surface leading from the abutment, a shaft mounted in the casing for rotating said element, handles on the shaft on the inner side and the outside of the door, respectively, of a plunger mounted to slide radially of the shaft, on the inner side of the casing into and out of relation with said abutment and into abutting relation with said arcuate surface, a manually shiftable lever pivoted on the inner side of the casing and provided with oppositely disposed circumferential cam faces for slidably shifting the plunger between, and holding it in its locking and releasing positions, a key-controlled cylinder lock accessible from the outside of the door, a second lever pivotally shiftable and controlled by the cylinder lock, and means engageable by the second lever for shifting the first lever from plunger releasing to plunger locking position and from plunger locking to plunger releasing position, said first named lever being shiftable to set the plunger into either its locking or releasing position when the cylinder lock is locked.

3. The combination with a casing on a door, a rotatable element mounted on the casing for shifting locking means for the door and provided with an abutment, a shaft mounted in the casing for rotating said element, handles on the shaft on the inner side and the outside of the door, respectively, of a plunger mounted to slide on the inner side of the casing into and out of relation with said abutment, a manually shiftable lever pivoted on the inner side of the casing and provided with oppositely disposed circumferential cam faces for shifting the plunger between and holding it in its locking and releasing positions, a key-controlled cylinder lock accessible from the outside of the door, a second lever pivoted concentrically with and shiftable and controlled by the cylinder lock, and a stud on the first named lever shiftable by the second lever for shifting said first lever from plunger releasing to plunger locking position and from plunger locking to plunger releasing position, said first named lever being shiftable independently of the second lever to set the plunger into either its locking or releasing position when the cylinder lock is locked.

4. The combination with a casing on a door, a rotatable element mounted on the casing for shifting locking means for the door and provided with an abutment and an arcuate surface, a shaft mounted in the casing for rotating said element, handles on the shaft on the inner side and the outside of the door, respectively, of a plunger mounted to slide on the inner side of the casing into and out of relation with said abutment and into abutting relation with said arcuate surface, a manually shiftable lever pivoted on the inner side of the casing and provided with oppositely disposed circumferential cam faces for shifting the plunger between and holding it in its locking and releasing positions, a key-controlled cylinder lock accessible from the outside of the door, a second lever pivoted concentrically with the cylinder lock and shiftable and controlled by the cylinder lock provided with radial arms, and means engageable by the arms of the second lever for shifting the first lever from plunger releasing to plunger locking position and from plunger locking to plunger releasing position, said first named lever being shiftable independently of the second lever to set the plunger into either its locking or releasing position when the cylinder lock is locked.

5. The combination with a casing on a door, a rotatable element mounted on the casing for shifting locking means for the door and provided with an abutment and an arcuate surface, a shaft mounted in the casing for rotating said element, handles on the shaft on the inner side and the outside of the door, respectively, of a plunger mounted to slide on the inner side of the casing into and out of relation with said abutment and into abutting relation with said arcuate surface, a manually shiftable lever pivoted on the inner side of the casing and provided with oppositely disposed circumferential cam faces for shifting the plunger between and holding it in its locking and releasing positions, a key-controlled cylinder lock accessible from the outside of the door, a second lever pivoted concentrically with the cylinder lock, and shiftable and controlled by the cylinder lock provided with radial arms, and means engageable by the arms of the second lever for shifting the first lever from plunger releasing to plunger locking position and from plunger locking to plunger releasing position, said first named lever being shiftable independently of the second lever to set the plunger into either its locking or releasing position when the cylinder lock is locked and pivotally concentrically with the second lever.

LEONARD O. CEDERWALL.